US 9,251,002 B2

(12) United States Patent
Manchek et al.

(10) Patent No.: US 9,251,002 B2
(45) Date of Patent: Feb. 2, 2016

(54) SYSTEM AND METHOD FOR WRITING CHECKPOINTING DATA

(71) Applicant: Stratus Technologies Bermuda Ltd., Hamilton (BM)

(72) Inventors: Robert Manchek, Waltham, MA (US); Steven Haid, Bolton, MA (US); Kimball A. Murray, Lowell, MA (US)

(73) Assignee: STRATUS TECHNOLOGIES BERMUDA LTD., Hamilton (BM)

( * ) Notice: Subject to any disclaimer, the term of this patent is extended or adjusted under 35 U.S.C. 154(b) by 13 days.

(21) Appl. No.: 14/107,536

(22) Filed: Dec. 16, 2013

(65) Prior Publication Data

US 2014/0201574 A1 Jul. 17, 2014

Related U.S. Application Data

(60) Provisional application No. 61/752,632, filed on Jan. 15, 2013.

(51) Int. Cl.
*G06F 11/00* (2006.01)
*G06F 11/14* (2006.01)

(52) U.S. Cl.
CPC ........ *G06F 11/1407* (2013.01); *G06F 11/1484* (2013.01)

(58) Field of Classification Search
None
See application file for complete search history.

(56) References Cited

U.S. PATENT DOCUMENTS

| 3,736,566 A | 5/1973 | Anderson et al. |
| 4,590,554 A | 5/1986 | Glazer et al. |
| 4,751,702 A | 6/1988 | Beier et al. |
| 4,758,951 A | 7/1988 | Sznyter, III |
| 4,831,581 A | 5/1989 | Rubinfeld |
| 5,099,485 A | 3/1992 | Bruckert et al. |
| 5,155,809 A | 10/1992 | Baker et al. |
| 5,157,663 A | 10/1992 | Major et al. |
| 5,193,162 A | 3/1993 | Bordsen et al. |
| 5,235,700 A | 8/1993 | Alaiwan et al. |
| 5,333,265 A | 7/1994 | Orimo et al. |
| 5,357,612 A | 10/1994 | Alaiwan |
| 5,404,361 A | 4/1995 | Casorso et al. |

(Continued)

FOREIGN PATENT DOCUMENTS

| EP | 0 750 261 A1 | 12/1996 |
| EP | 0 974 912 A2 | 1/2000 |

(Continued)

OTHER PUBLICATIONS

Clark et al., "Live Migration of Virtual Machines," NSDI '05 2<sup>nd</sup> Symposium on Networked Systems Design & Implementation, USENIX Association, May 4, 2005, pp. 273-286.

(Continued)

*Primary Examiner* — Amine Riad
(74) *Attorney, Agent, or Firm* — K&L Gates LLP

(57) ABSTRACT

In part, the invention relates to a system and method for writing checkpointing data to a computer having a standby virtual machine for each checkpointed component on a computer having an active virtual machine. In one embodiment, the checkpointing data is processed on a per virtual machine basis. This is performed in a way that allows checkpointing data packets from multiple sources to be transferred asynchronously, subsequently reassembled into a coherent checkpoint message, and applied asynchronously.

13 Claims, 10 Drawing Sheets

(56) References Cited

U.S. PATENT DOCUMENTS

| | | |
|---|---|---|
| 5,465,328 A | 11/1995 | Dievendorff et al. |
| 5,568,380 A | 10/1996 | Brodnax et al. |
| 5,615,403 A | 3/1997 | Bissett et al. |
| 5,621,885 A | 4/1997 | Del Vigna, Jr. |
| 5,694,541 A | 12/1997 | Service et al. |
| 5,721,918 A | 2/1998 | Nilsson et al. |
| 5,724,581 A | 3/1998 | Kozakura |
| 5,745,905 A | 4/1998 | Larsson et al. |
| 5,787,485 A | 7/1998 | Fitzgerald, V et al. |
| 5,790,397 A | 8/1998 | Bissett et al. |
| 5,802,265 A | 9/1998 | Bressoud et al. |
| 5,892,928 A | 4/1999 | Wallach et al. |
| 5,896,523 A | 4/1999 | Bissett et al. |
| 5,913,021 A | 6/1999 | Masubuchi |
| 5,918,229 A | 6/1999 | Davis et al. |
| 5,923,832 A | 7/1999 | Shirakihara et al. |
| 5,933,838 A | 8/1999 | Lomet |
| 5,948,112 A | 9/1999 | Shimada et al. |
| 5,958,070 A | 9/1999 | Stiffler |
| 5,968,185 A | 10/1999 | Bressoud et al. |
| 6,023,772 A | 2/2000 | Fleming |
| 6,035,415 A | 3/2000 | Fleming |
| 6,067,550 A | 5/2000 | Lomet |
| 6,088,773 A | 7/2000 | Kano et al. |
| 6,098,137 A | 8/2000 | Goodrum et al. |
| 6,105,148 A | 8/2000 | Chung et al. |
| 6,141,769 A | 10/2000 | Petivan et al. |
| 6,158,019 A | 12/2000 | Squibb |
| 6,289,474 B1 | 9/2001 | Beckerle |
| 6,301,677 B1 | 10/2001 | Squibb |
| 6,397,242 B1 | 5/2002 | Devine et al. |
| 6,401,216 B1 | 6/2002 | Meth et al. |
| 6,438,705 B1 | 8/2002 | Chao et al. |
| 6,453,343 B1 | 9/2002 | Housel, III et al. |
| 6,526,447 B1 | 2/2003 | Giammaria |
| 6,687,849 B1 | 2/2004 | Cherf |
| 6,718,538 B1 | 4/2004 | Mathiske |
| 6,823,474 B2 | 11/2004 | Kampe et al. |
| 6,907,477 B2 | 6/2005 | Altman et al. |
| 6,954,877 B2 | 10/2005 | Earl et al. |
| 6,978,400 B2 | 12/2005 | Hickson et al. |
| 7,039,663 B1 | 5/2006 | Federwisch et al. |
| 7,055,063 B2 | 5/2006 | Leymann et al. |
| 7,058,846 B1 | 6/2006 | Kelkar et al. |
| 7,076,555 B1 | 7/2006 | Orman et al. |
| 7,080,375 B2 | 7/2006 | Martin |
| 7,162,698 B2 | 1/2007 | Huntington et al. |
| 7,206,964 B2 | 4/2007 | Moser et al. |
| 7,249,118 B2 | 7/2007 | Sandler et al. |
| 7,289,433 B1 | 10/2007 | Chmara et al. |
| 7,299,337 B2 | 11/2007 | Traut et al. |
| 7,310,721 B2 | 12/2007 | Cohen |
| 7,363,538 B1 | 4/2008 | Kundu et al. |
| 7,380,039 B2 | 5/2008 | Miloushev et al. |
| 7,392,433 B2 | 6/2008 | Sahoo et al. |
| 7,545,752 B2 | 6/2009 | Krautkremer et al. |
| 7,577,934 B2 | 8/2009 | Anonsen et al. |
| 7,603,391 B1 | 10/2009 | Federwisch et al. |
| 7,743,381 B1 | 6/2010 | Tran |
| 7,934,035 B2 | 4/2011 | Miloushev et al. |
| 8,117,496 B2 | 2/2012 | Bashir et al. |
| 8,145,945 B2 * | 3/2012 | Lee .................. G06F 11/1658 714/15 |
| 8,806,266 B1 * | 8/2014 | Qu .................. G06F 11/1484 714/13 |
| 8,812,907 B1 * | 8/2014 | Bissett .................. G06F 11/00 714/20 |
| 2002/0073249 A1 | 6/2002 | French et al. |
| 2002/0073276 A1 | 6/2002 | Howard et al. |
| 2002/0078308 A1 | 6/2002 | Altman et al. |
| 2002/0147890 A1 | 10/2002 | Saulsbury et al. |
| 2003/0005102 A1 | 1/2003 | Russell |
| 2003/0005356 A1 | 1/2003 | Franckowiak et al. |
| 2003/0084376 A1 | 5/2003 | Nash et al. |
| 2003/0163763 A1 | 8/2003 | DeLano |
| 2004/0010663 A1 | 1/2004 | Prabhu |
| 2004/0143776 A1 | 7/2004 | Cox |
| 2004/0158549 A1 | 8/2004 | Matena et al. |
| 2004/0193658 A1 | 9/2004 | Kawamura et al. |
| 2004/0193945 A1 | 9/2004 | Eguchi et al. |
| 2004/0199812 A1 | 10/2004 | Earl et al. |
| 2004/0267897 A1 | 12/2004 | Hill et al. |
| 2005/0015702 A1 | 1/2005 | Shier et al. |
| 2005/0201373 A1 | 9/2005 | Shimazu et al. |
| 2005/0229039 A1 | 10/2005 | Anderson et al. |
| 2005/0251785 A1 | 11/2005 | Vertes et al. |
| 2005/0256826 A1 | 11/2005 | Hambrick et al. |
| 2006/0047925 A1 | 3/2006 | Perry |
| 2006/0062142 A1 | 3/2006 | Appanna et al. |
| 2006/0112297 A1 | 5/2006 | Davidson |
| 2006/0179147 A1 | 8/2006 | Tran et al. |
| 2007/0027985 A1 | 2/2007 | Ramany et al. |
| 2007/0174484 A1 | 7/2007 | Lussier et al. |
| 2009/0113109 A1 | 4/2009 | Nelson et al. |
| 2009/0193298 A1 | 7/2009 | Mukherjee |
| 2010/0077164 A1 | 3/2010 | Stiffler et al. |
| 2010/0107158 A1 | 4/2010 | Chen et al. |
| 2010/0325500 A1 | 12/2010 | Bashir et al. |
| 2011/0161639 A1 | 6/2011 | Knauth et al. |
| 2011/0167194 A1 | 7/2011 | Scales et al. |
| 2011/0167195 A1 | 7/2011 | Scales et al. |
| 2011/0167196 A1 | 7/2011 | Scales et al. |
| 2011/0167298 A1 * | 7/2011 | Lee .................. G06F 11/1658 714/18 |
| 2011/0289417 A1 * | 11/2011 | Schaefer .............. G06F 11/1458 715/735 |
| 2012/0011401 A1 | 1/2012 | Ranganathan et al. |
| 2012/0011508 A1 | 1/2012 | Ahmad |
| 2012/0084520 A1 | 4/2012 | Chou et al. |
| 2012/0284721 A1 | 11/2012 | Antani et al. |
| 2013/0212205 A1 * | 8/2013 | Flockhart ................. H04L 69/40 709/208 |
| 2014/0040206 A1 * | 2/2014 | Ramakrishnan .... G06F 11/2097 707/640 |
| 2014/0164591 A1 * | 6/2014 | Bickford et al. .............. 709/224 |
| 2015/0009804 A1 * | 1/2015 | Koponen .............. H04L 41/0695 370/219 |
| 2015/0127809 A1 * | 5/2015 | Akella .................. H04L 47/125 709/224 |
| 2015/0180761 A1 * | 6/2015 | Watanabe ................ H04L 41/12 709/238 |
| 2015/0205672 A1 * | 7/2015 | Bissett ................. G06F 11/1407 714/18 |

FOREIGN PATENT DOCUMENTS

| | | |
|---|---|---|
| GB | 2 268 817 A | 1/1994 |
| JP | 10-320326 A | 12/1998 |
| JP | 2004-206212 A | 7/2004 |
| WO | 92/17842 A1 | 10/1992 |
| WO | 99/26133 A2 | 5/1999 |

OTHER PUBLICATIONS

Cully et al., "Remus: High Availability via Asynchronous Virtual Machine Replication," The University of British Columbia, Department of Computer Science, 14 pages.

Kim et al., "Process Allocation for Load Distribution in Fault-Tolerant Multicomputers," IEEE Publication, pp. 174-183, 1995.

Nakamikawa et al., "High Performance Fault Tolerant Computer and its Fault Recovery," 1997 IEEE, pp. 2-6.

Tamura, "Modernization of Kemari using HVM with PV Drivers," Nippon Telegraph and Telephone Corporation, NTT Cyber Space Labs, Nov. 20, 2008, 23 pages.

Tamura et al., "Kemari: Virtual Machine Synchronization for Fault Tolerance," NTT Cyber Space Labs, 2 pages.

Tamura, "Kemari: Virtual Machine Synchronization for Fault Tolerance using DomT," Nippon Telegraph and Telephone Corporation, NTT Cyber Space Labs, Jun. 24, 2008, 19 pages.

(56) References Cited

OTHER PUBLICATIONS

Tamura et al., "Virtual Machine Synchronization for High Availability Clusters," Nippon Telegraph and Telephone Corporation, NTT Cyber Space Labs, Apr. 17, 2007, 17 pages.

PCT International Search Report for International Application No. PCT/US06/19754, dated Oct. 17, 2007, 3 pages.

Supplementary European Search Report for Application No. EP 06770856, completed Nov. 10, 2010, 6 pages.

PCT International Search Report and PCT Written Opinion of the International Searching Authority for International Application No. PCT/US2014/070461, mailed Apr. 2, 2015, 9 pages.

International Search Report and the Written Opinion of the International Searching Authority for International Application No. PCT/US2014/070456, mailed Jun. 22, 2015, 16 pages.

PCT International Search Report and the Written Opinion Application No. PCT/US2014/070453, mailed Aug. 21, of the International Searching Authority for International 2015, 24 pgs.

\* cited by examiner

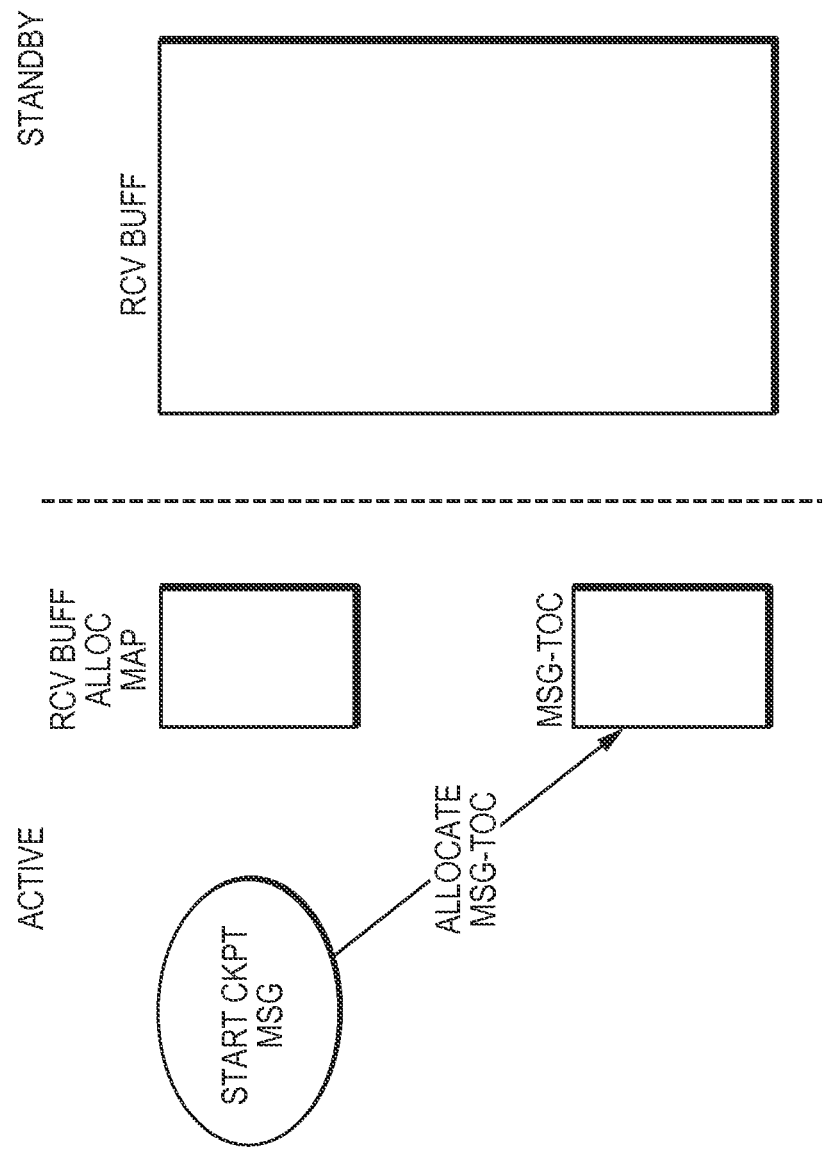

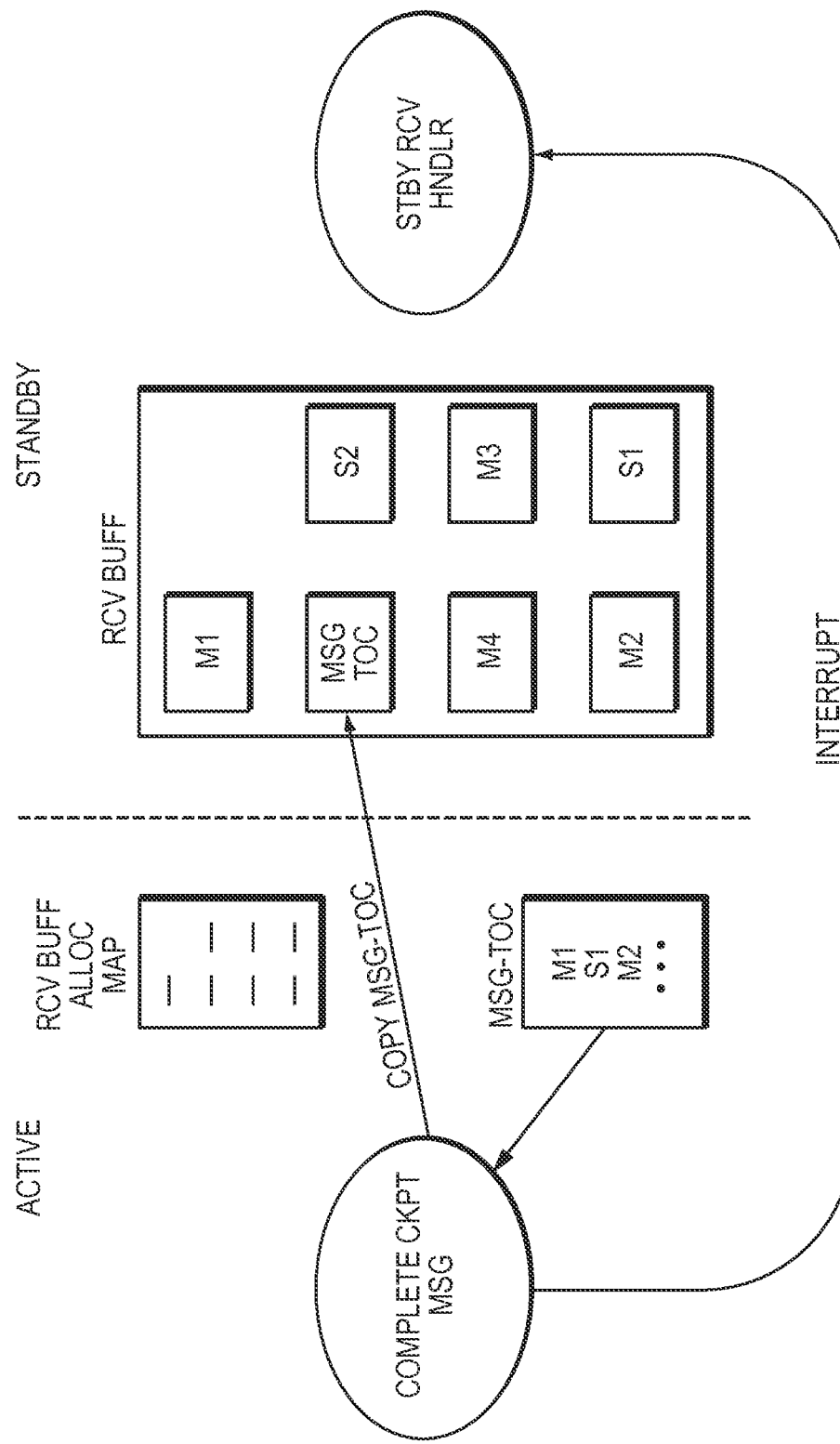

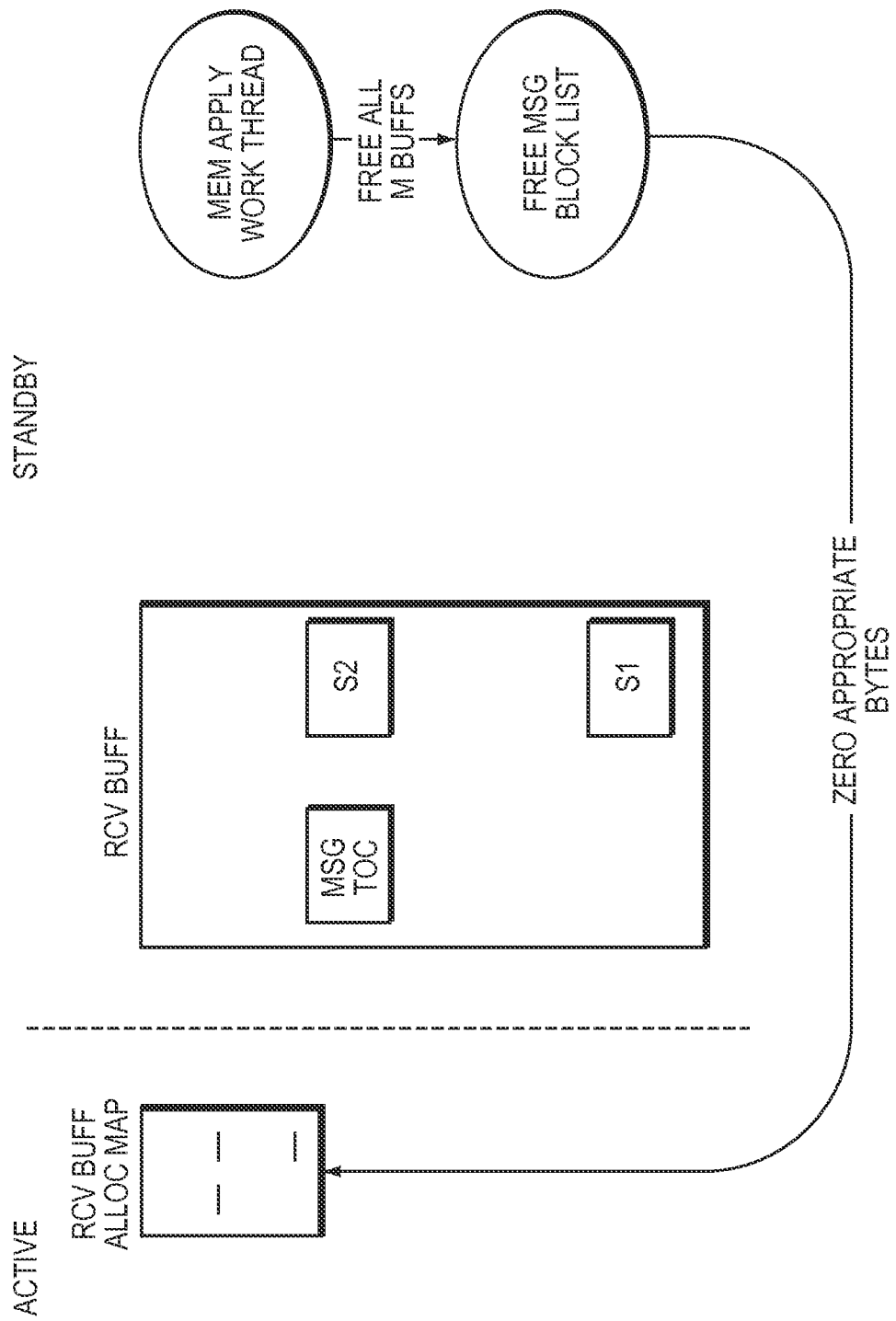

SYSTEM AND METHOD FOR WRITING CHECKPOINTING DATA

CROSS-REFERENCE TO RELATED APPLICATIONS

This application claims priority to and the benefit of U.S. provisional patent application 61/752,632 filed on Jan. 15, 2013, the entire contents of which are hereby incorporated by reference herein

FIELD OF THE INVENTION

The system relates generally to fault tolerant computing and more specifically to methods of checkpointing data.

BACKGROUND OF THE INVENTION

Fault tolerant systems support computer architectures that require only a few minutes of downtime a year. Achieving extended computing uptime often requires redundant computing systems with multiple processors, specialized interconnects, and various monitoring and control modules. One approach to fault tolerant system design uses two or more processors operating in lock step synchronicity. In these lock step systems, the processors perform substantially the same operations and provide substantially the same output data at substantially the same time. Accordingly, if one of the processors fail, a particular transaction or mathematical operation is still in process within the other secondary or standby processors as a result of the dual processing paths. This processing redundancy is advantageous, but not without additional costs and considerations.

Another approach for achieving fault tolerance is to have two computers interconnected, such that one computer, the active computer or host, actively makes calculations while the other computer is idle or on standby in case the active computer experiences some failure. In these systems the information about the state of the active computer must be saved periodically to the standby computer—so that the standby computer can substantially take over at the point in the calculations where active computer experienced a failure.

One way to synchronize the state of operations for two processors is through checkpointing. In checkpointing, the active processor halts either periodically or in the cause of a specific event, and sends its data about its state change to the standby computer. During the checkpointing operation the host computer is not performing useful calculations. The length of the checkpointing interval needs to be kept at a minimum while still providing sufficient time for the requisite checkpoint operations to take place. Because of the nature of checkpointing data, the data must be complete and in the correct order on the standby computer when the data is acted upon or committed.

This issue becomes especially important when the processors each run virtual machines for each of their applications. Each virtual machine requires its own checkpoint data and transfer of that data to the standby virtual machine. Checkpointing several virtual machines can require a significant amount of time and is complicated to perform in a timely and organized manner. Processing slowdowns and errors can occur when performing such checkpointing.

The present invention addresses this issue.

SUMMARY OF THE INVENTION

In part, the invention relates to a system and method for writing checkpointing data from a host computer having an active virtual machine to a standby computer having a standby virtual machine. The virtual machine can include a guest. In one embodiment, checkpoint data can be generated for each component on the host being checkpointed. A component can be a memory component, a processor, a disk, or another virtual or tangible component of the host or standby computer. The method is performed such that multiple checkpoint data packets can be transferred from a component on the active virtual machine to the standby virtual machine without waiting for other data packets from other components. Thus, if the data packets from other components are larger or otherwise generated at a slower rate by another component of the active virtual machine, checkpoint data that is ready for transfer to the standby computer can be sent when available for transmission. In this way, data for components can be sent out of order or interleaved with data from different components. A table of contents can be used to track the checkpoint data for each component for subsequent assembly and processing as a checkpoint on a per component basis.

BRIEF DESCRIPTION OF THE DRAWINGS

The structure and function of the invention can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

FIGS. 3A-3G are highly schematic diagrams of various data transfer stages between a node with an active virtual machine and a node with a standby virtual machine, and the steps for an embodiment of a checkpointing method performed in accordance with the invention.

DESCRIPTION OF A PREFERRED EMBODIMENT

The invention will be more completely understood through the following detailed description, which should be read in conjunction with the attached drawings. Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

In part, the invention relates to a software-based fault tolerant system. The fault tolerant system includes two nodes such as computing devices. The fault tolerant system and parameters associated with it can be adjusted using a user interface in one embodiment.

Figure 1A:
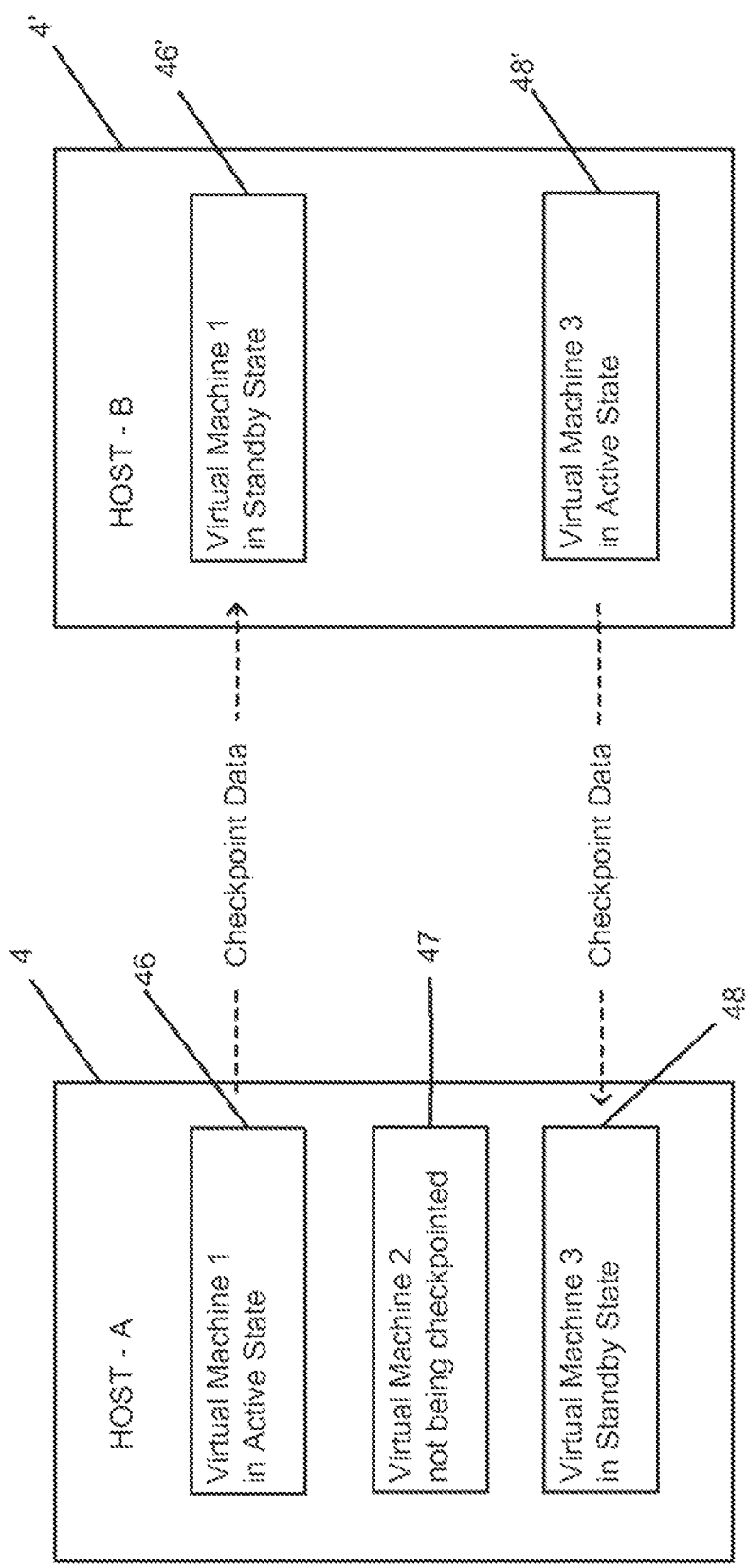
FIG. 1a is a block diagram of an embodiment of a two node software-based fault system utilizing virtual machines.

In brief overview and referring to FIG. 1a, a block diagram of an embodiment of a system constructed in accordance with the invention includes a first physical computing device 4 and a second physical computing device 4' which can also be referred to in the alternative as nodes or hosts 4, 4'. Each host 4 and host 4' runs virtualization software to enable a virtual computer or virtual machine. Several virtual machines may operate within a given host. In FIG. 1a, host 4 includes three virtual machines 46, 47, 48 while host 4' has two virtual machines 46' and 48'. The virtual machines run application programs that are generally referred to as "guests". The virtual machine actively running the guest is the "active" virtual machine. The equivalent but inactive virtual machine running on the standby node 4' is the "standby virtual machine" 46'. Although the standby virtual machine 46' is not executing the guest program, periodically the active virtual machine 46 pauses and transfers checkpoint or state data to the standby virtual machine 46'. If the active virtual machine 46 fails, the standby virtual machine 46' then becomes the active virtual machine using the state information provided in the checkpoint data to take over the processing tasks of the previous active virtual machine 46 at the time the checkpoint occurred. Detecting an error event in the active virtual machine and switching to the standby virtual machine is termed a failover in one embodiment.

For a given pair of hosts, one host, for example host 4, may have one virtual machine 46 in an active state and another virtual machine 48 in a standby state. Similarly, the same can be true with host 4'. As such, checkpoint data may flow from the active virtual machine 46 of host 4 to the standby virtual machine 46' of host 4'. Alternatively, checkpoint data can flow to the standby virtual machine 48 of host 4 from the active virtual machine 48' of host 4'.

The data sent as a checkpoint includes the changes that have occurred to the active virtual machine since the previous checkpoint. This checkpoint data includes changes to the memory, processor and other virtualized hardware of the active virtual machine. Because during the capture of the checkpoint data, the active virtual machine is not executing the guest program, it is important to make the amount of time the virtual machine is paused as short as possible.

An exception to these steps is that changes to disk storage may be sent to the standby virtual machine from the active virtual machine, as soon as the guest on the active virtual machine issues a disk write. That is, the write data is transferred to the standby virtual machine as soon as it is written to disk by the active virtual machine.

Figure 1B:
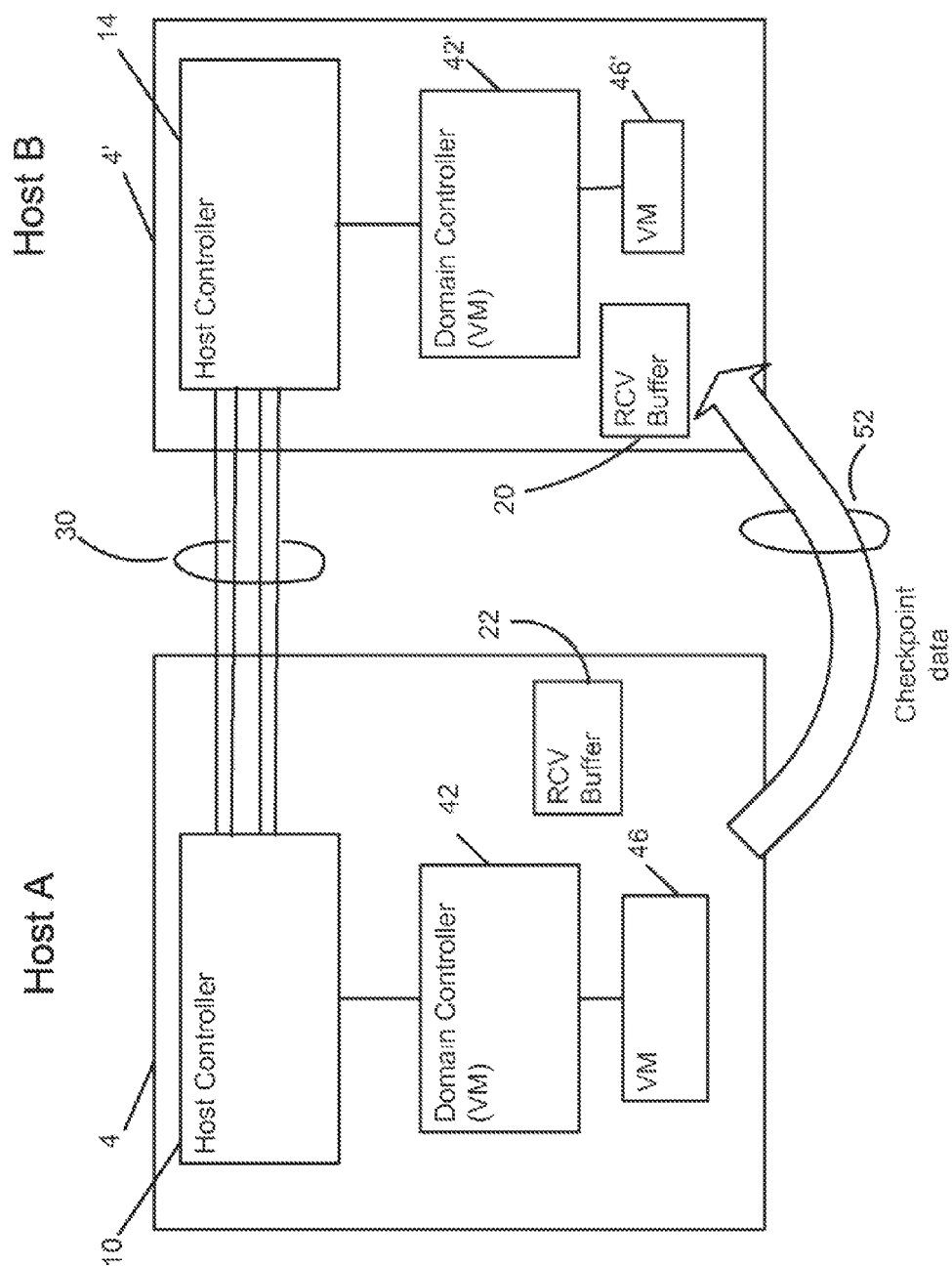
FIG. 1b is a block diagram of an embodiment of a two node system using checkpointing in accordance with the invention.

Referring to FIG. 1b, in one embodiment, the host node 4 is a first computing device that includes a first subsystem that includes a first processor, devices, and a first memory. In one embodiment, host 4' is a second computing device and includes a second subsystem that includes a second processor, a second cache, and a second memory. Each node can include various buffers such as one or more send buffers and one or more receive buffers. The buffers can be filled with messages that include blocks of data such as checkpointing data. A checkpointing engine executes on the active node. A separate control or client node can be used to initiate and control parameters relating to checkpoints in one embodiment.

In one embodiment as shown in FIG. 1b, node 4 and the standby node 4' each include a respective controller 10, 14. Each controller (or another component of the node) also includes a memory device. The node 4 with the active virtual machine and the node 4' with the standby virtual machine are in communication over one or more independent communications lines 30. Additional communications lines 30 can be used for bandwidth or redundancy in a given embodiment.

Each computing device 4, 4' also includes the checkpointing engine or is in communication with such a checkpointing engine that generates checkpoint data. This checkpoint data is suitable for transmitting from the node 4 with the active virtual machine to the node 4' with the standby virtual machine. In turn, the checkpoint engine can be implemented as one or more software modules configured to monitor the node with the active virtual machine and relay information relating to the state of the node with the active virtual machine to the standby virtual machine. Various data handlers can also be used. In one embodiment, a receive (RCV) buffer 20 is used to receive messages relating to checkpoint data at the standby node 4'. Since the node 4 with the active virtual machine 46 can become a standby node, it also includes a RCV buffer 22.

Each of the active and standby nodes includes a domain controller module 42, 42' which controls the operation of one or more virtual machines (VM) 46, 46' that execute a given application. Each node also includes local disk storage and one or more communication links 52 that transmit checkpoint data between each of the virtual machines located on each node 4, 4'. A given virtual machine 46, 46' is an active virtual machine for a given application while the remaining virtual machine for that application on the other node is the standby virtual machines.

Figure 2:
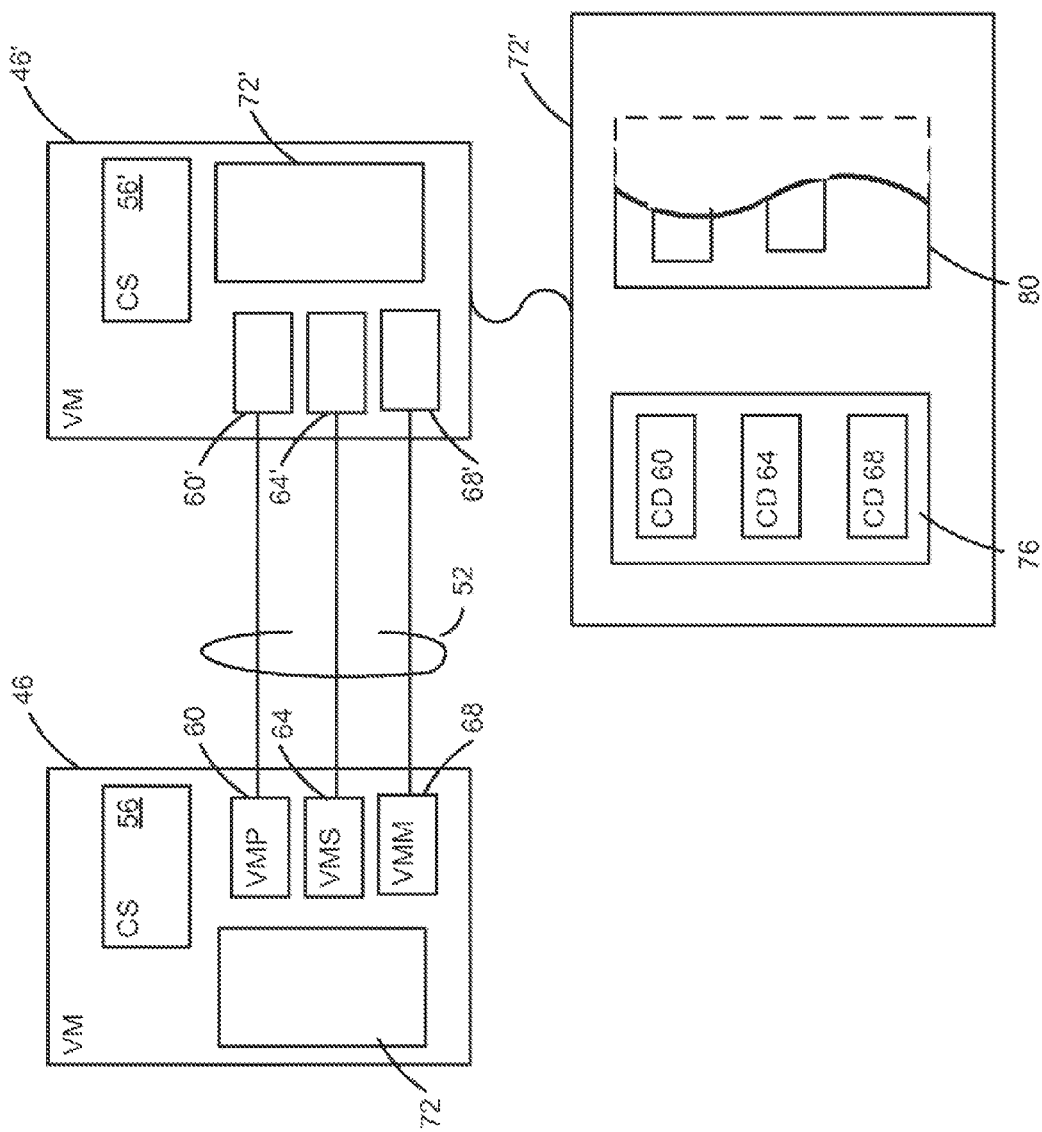
FIG. 2 is a block diagram of an embodiment of the system of FIG. 1b showing in more detail virtual machines (VMs) on the two node system in accordance with the invention.

Referring also to FIG. 2, in more detail a fault tolerant system constructed in accordance with this invention includes at least two physical processors each executing a plurality of virtual machines. Each virtual machine 46, 46' (only one virtual machine is shown for each physical processor for clarity) includes its own memory partition, its own process, and its own storage partition. Each virtual machine component on the computer with the active virtual machine communicates with its equivalent component on the computer with the standby virtual machine.

More specifically, each host 4, 4' includes coordination software (CS) 56, 56' that controls the transference of checkpoint data between the two virtual machines 46, 46'. This CS can be the checkpointing engine or in communication with such an engine. Checkpoint data originates principally from three components of each virtual machine: the virtual machine process itself 60, 60', the virtual machine storage 64, 64' and the virtual machine memory 68, 68'. Checkpoint data from each of these components 60, 64, 68 may be sent separately across the communications link 52 from the checkpoint originating virtual machine 42 to the corresponding components 60', 64', 68' on the standby virtual machine 46' of the other computing device.

In one embodiment, this checkpoint data cannot be committed or acted upon until all the data relating to that checkpoint is received by the standby virtual machine 46'. However, since each component 60, 64, 68 acts independently, not all the data is received or committed simultaneously at the standby computing device. For example data written to physical storage takes longer to write than data written to memory. Further the amount of data for a virtual processor, virtual memory and virtual storage can vary significantly.

To avoid this, instead of restricting the transfer of data from each virtual machine component until the checkpoint data from another virtual machine component is completed, the checkpointing data for each virtual machine component is broken into packets and each packet is written independently to the standby receive buffer by the host computer with the active virtual machine. Each packet is received and written into the RCV buffer 72' for that virtual machine and later collected into a checkpoint packet 76.

In one embodiment, the checkpoint packet 76, for example, holds checkpoint data (CD 60, CD 64, CD 68) from each of the components 60, 64, 68. Once all the data has been received, the virtual machine software 56' on the node with the standby virtual machine permits the checkpoint data to be committed in the standby virtual machine 46'. That is, any storage checkpoint data CD 64 is written to local storage 64'; memory checkpoint data CD 64 is written to memory 64'; and process checkpoint data CD 60 is written to the process 60' on the virtual machine 46. In this manner the checkpoint process is completed more rapidly than if the data from a single virtual component must be received before the checkpoint data for the next component is transferred.

In one embodiment, implementing fault tolerant operation using a software-based approach requires periodic precisely defined state transfers between the node with the active virtual machine and the node with the standby virtual machine. Specifically the state transfer must be complete, contain no extraneous state data (i.e. state data associated with states other than the one corresponding to the present checkpoint) and both nodes need to agree when the entire state transfer has completed. This invention includes a protocol by which the requisite state transfer tracking is an integral component when passing checkpointing information across the physical links connecting the active and standby nodes.

Figure 3B:
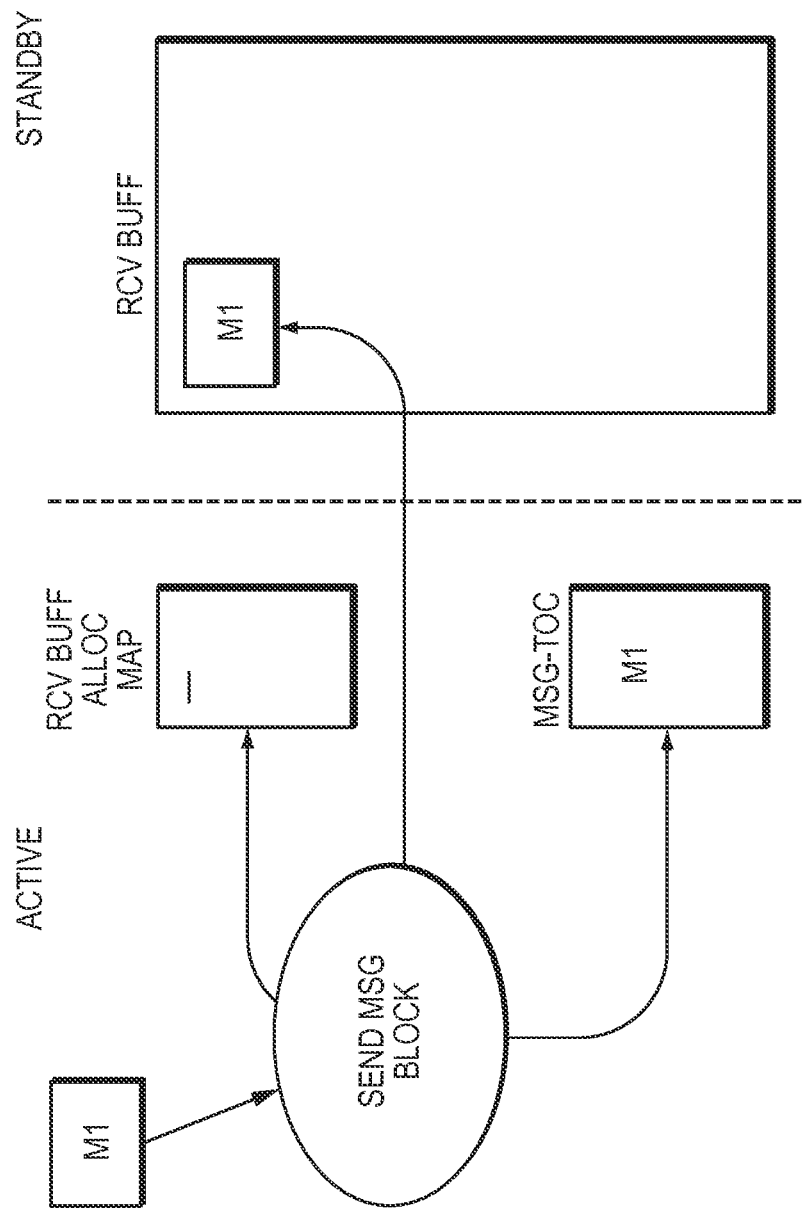

Referring to FIGS. 3A-3G, a node with an active virtual machine 46 and a node with a standby virtual machine 46' are shown during various stages of the sending and receiving of checkpoint (CHKP) data through one or more packets or messages (MSG). In one embodiment, a message or a packet can include a table of contents (TOC). As shown in FIG. 3A, initially when a checkpoint occurs on the host computer with an active virtual machine, the checkpoint process is started by the checkpoint handling software as part of a checkpointing engine by allocating space for a table of contents for the messages being transferred to the node with the standby virtual computer. The checkpoint data originates at the active virtual machine node 4 and is divided into a series of packets or messages.

The checkpoint data is broken into a series of packets and the TOC keeps track of the order in which the packets must be reassembled and to what checkpoint data the packets belong; virtual memory data, virtual storage data or virtual process data.

In one embodiment, each checkpoint packet is written to a location in the receive buffer (RCV buffer) 72' on the node 4' with the standby virtual machine 46' by the node with the active virtual machine 46. The RCV buffer 72' includes a plurality of pages of memory. During the setup stage of the system, each node 4 and 4' includes a receive buffer allocation map for the receive buffer on the other node. The receive buffer allocation map is used by the node with the active virtual machine to allocate space in the receive buffer in the node with the standby virtual machine 46'. When a page of RCV buffer on the node with the standby virtual machine is written to by the node with the active virtual machine 46, the corresponding byte in the allocation map on the node with the active virtual machine is set to 1. These bytes are the mechanism by which the node with the active virtual machine is able to track that a given page of the RCV buffer has been written to with a portion of a checkpoint message.

Referring to FIG. 3B, when ready, the node with the active virtual machine writes the first checkpoint packet of checkpoint data (M1) from, for example, VM memory 60 (FIG. 2) to the RCV buffer of the node with the standby virtual machine. The node with the active virtual machine sets the corresponding bytes in the allocation map indicating that one or more RCV Buffer memory pages have been allocated to the checkpoint data, and adds a descriptor of the location and size of the M1 packet to the TOC.

Figure 3C:
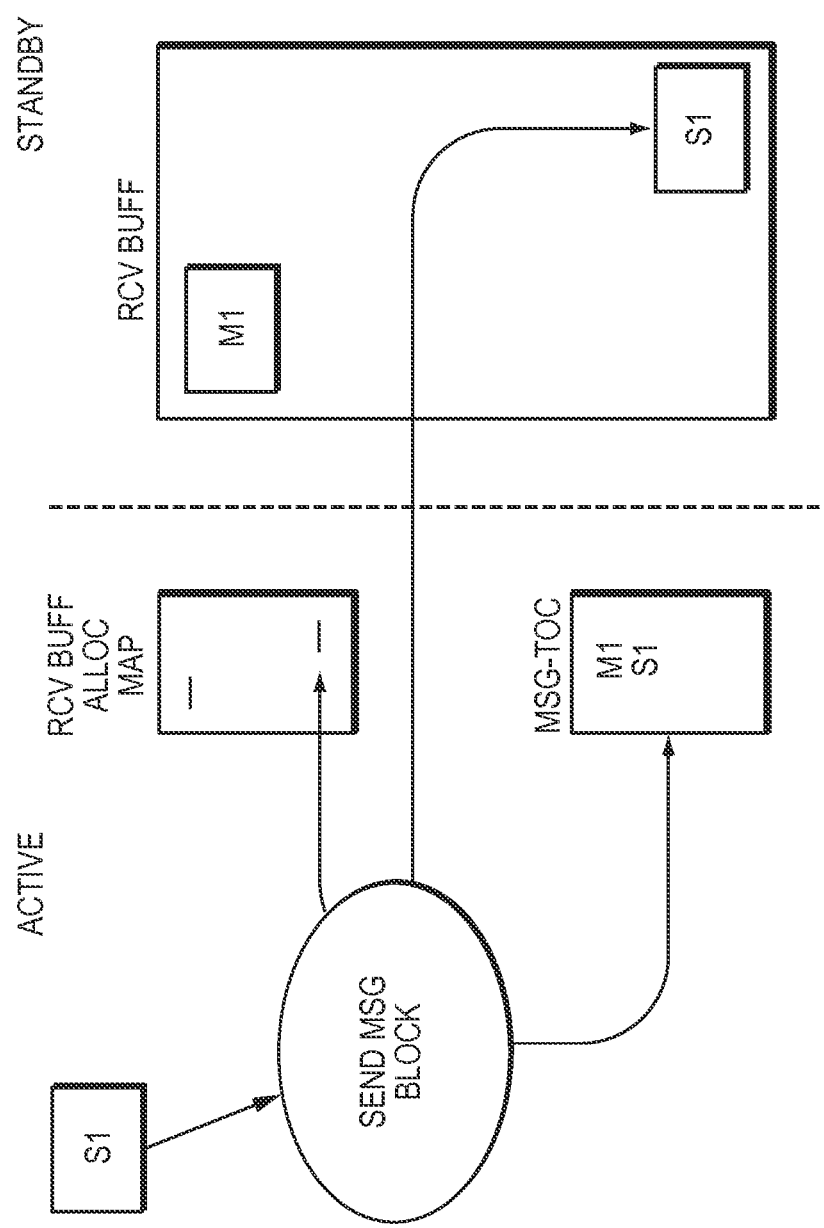
Figure 3E:
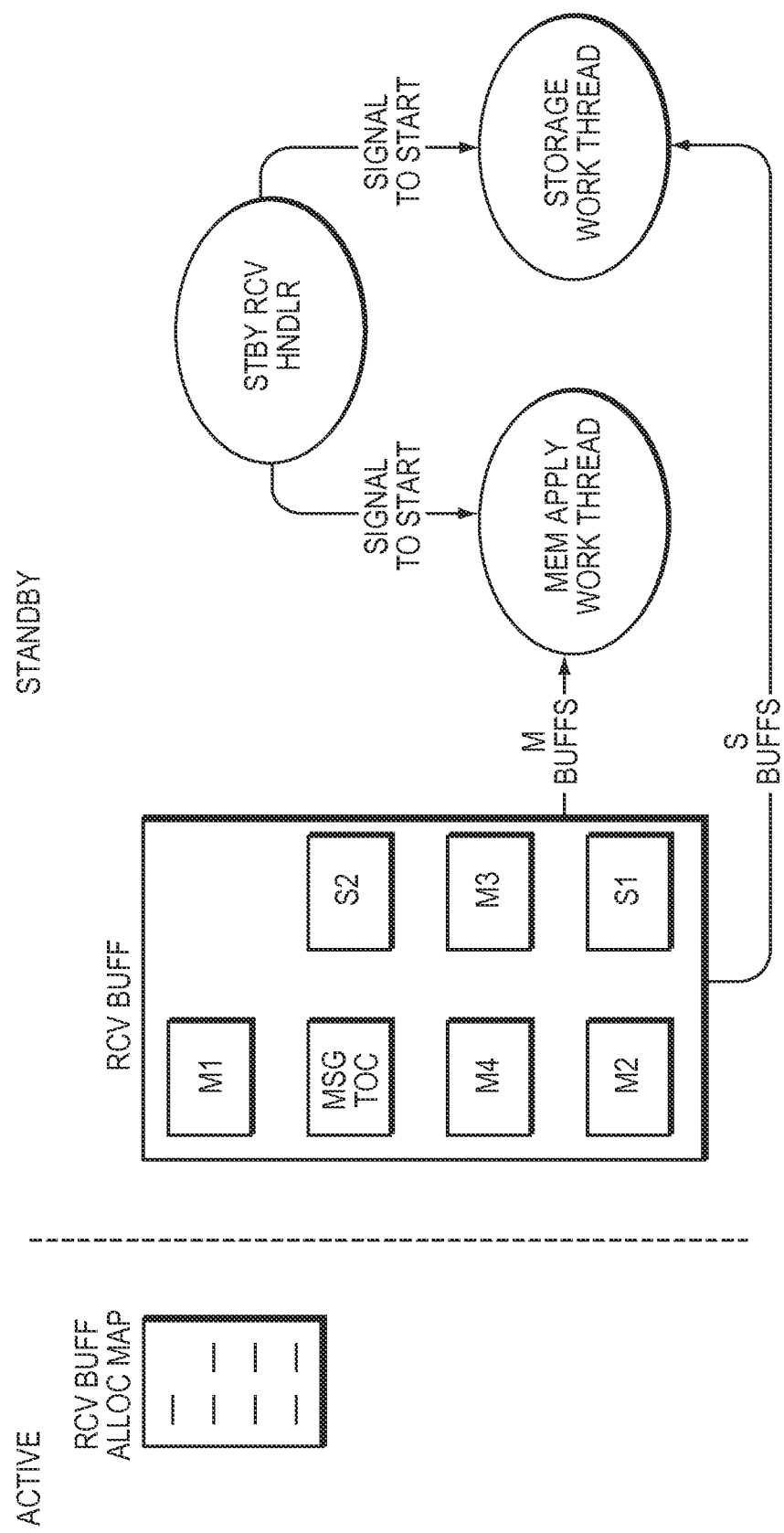
Figure 3G:
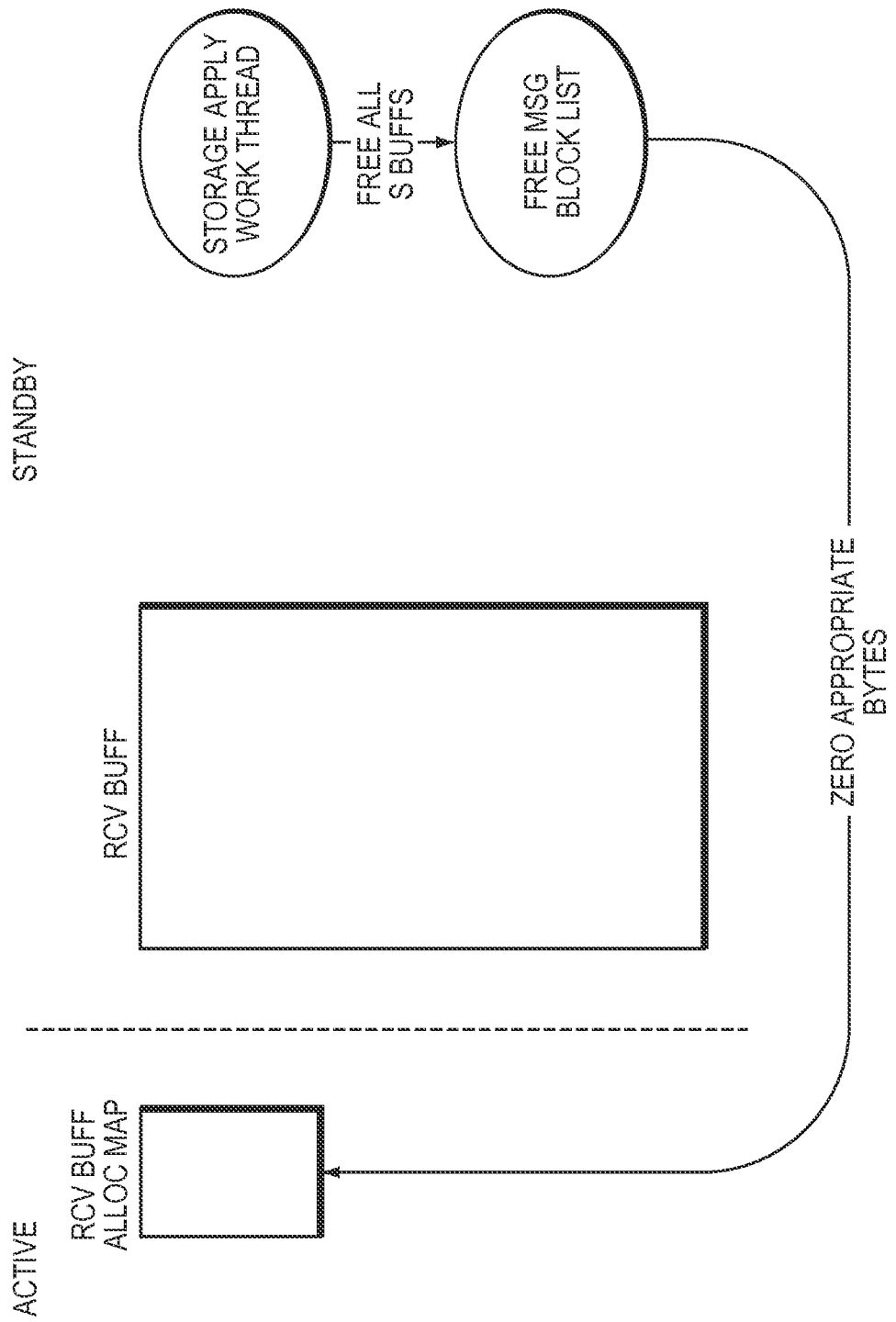

The checkpoint data from virtual storage 64 (FIG. 2), is divided into messages (S1) and the data packet S1 is copied to a location in the node with the standby virtual machine RCV buffer (FIG. 3C). On the node with the active virtual machine, the Receive Buffer Allocation Map locations are set to 1 and an S1 descriptor is added to the TOC. As additional memory (M2) and storage (S2) packets are written to the RCV buffer 72 the process is repeated.

Referring to FIG. 3D, once all the checkpoint data, including process checkpoint data (which is not shown on the diagram for clarity) has been written by the node with the active virtual machine to the RCV buffer of the standby node, the software on the node with the active virtual machine generates a "checkpoint complete" instruction. The TOC is copied from the node with the active virtual machine to the RCV buffer of the node with the standby virtual machine and an interrupt message is sent from the node with the active virtual machine to the Standby Receiver Handler on the other node.

At this point, (FIG. 3E), the memory data packets (M), process data packets (P) and storage data packets (S) are passed by the Standby Receiver Handler to the corresponding Process, Memory and Storage Apply Working Threads to commit the data (Process Apply Working Thread not shown for clarity). The Apply Working Threads use the TOC for the receive buffer to arrange the correct data packets in the correct order.

Once all the memory buffers (M) have been committed, (FIG. 3F) the Memory Apply Working Thread, which is on the node with the standby virtual machine, clears the appropriate bytes in the RCV Buffer Allocation Map which is on the node with the active virtual machine.

Similarly, once all the storage buffers (S) have been committed, (FIG. 3G) the Storage Apply Working Thread, which is on the node with the standby virtual machine, clears the appropriate bytes in the RCV Buffer Allocation Map which is on the node with the active virtual machine This process repeats for the Process Apply Working Thread (not shown).

At this point the entire checkpoint message has now been completely processed for all components and RCV buffer on the standby node and the RCV buffer of the node with the active virtual machine are clear for the next checkpoint data transfer.

Some portions of the detailed description are presented in terms of algorithms and symbolic representations of operations on data bits within a computer memory. These algorithmic descriptions and representations can be used by those skilled in the computer and software related fields.

Unless specifically stated otherwise as apparent from the following discussion, it is appreciated that throughout the description, discussions utilizing terms such as "processing" or "computing" or "calculating" or "comparing", "generating" or "determining" or "committing" or "checkpointing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

The use of headings and sections in the application is not meant to limit the invention; each section can apply to any aspect, embodiment, or feature of the invention.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

What is claimed is:

1. A method for writing checkpointing data to a node with a standby virtual machine for each checkpointed component of an active virtual machine comprising the steps of:
    a) dividing checkpoint data into one or more checkpoint packets on the node with the active virtual machine;
    b) writing a checkpoint packet to the receive buffer on the node with the standby virtual machine;
    c) storing a descriptor of the checkpoint packet in a table of contents (TOC) on the node with the active virtual machine;
    d) repeating steps b and c until all the checkpoint data for each component being checkpointed is transferred;
    e) transferring the table of contents (TOC) from the node with the active virtual machine to the node with the standby virtual machine;
    f) sending an interrupt to the node with the standby virtual machine indicating that all the checkpoint data has been transferred; and
    g) committing the checkpoint data on the node with the standby virtual machine wherein the table of contents (TOC) comprises information concerning the order in which the packets must be reassembled and to what data the checkpoint packets belong.

2. The method of claim 1 wherein the receive buffer comprises a plurality of memory pages and the method further comprises the step of entering a byte in a receive buffer allocation map on the node with the active virtual machine for each page of receive buffer storing a checkpoint data packet transferred to the node with the standby virtual machine.

3. The method of claim 2 further comprising the steps of: removing the checkpoint data from the receive buffer on the node with the standby virtual machine; and clearing the receive buffer allocation map on the node with the active virtual machine after the checkpoint data has been committed.

4. The method of claim 3 wherein the checkpoint data on the node with the standby virtual machine is cleared by a first program during or after committing the checkpoint data.

5. The method of claim 4 wherein a second program commits checkpoint data for each component being checkpointed.

6. The method of claim 1 wherein the steps a-g are performed for each checkpointed component on each virtual machine of the node with the active virtual machine.

7. The method of claim 6 wherein the checkpointed components comprise virtual process, virtual memory and virtual storage.

8. A system for writing checkpointing data to a node having a standby virtual machine for each checkpointed component of a node with an active virtual machine comprising:
    a first memory for the node with the active virtual machine;
    a second memory for the node with a standby virtual machine, the memory for the node with the standby virtual machine comprising a receive buffer;
    an allocation process on node with the active virtual machine for writing checkpoint data into one or more checkpoint packets;
    a write process on node with the active virtual machine for writing a checkpoint packet to the receive buffer on the standby node;
    a descriptor process on the node with the active virtual machine for entering a descriptor of the checkpoint packet into a table of contents in the memory of the node with the active virtual machine;

a completion process on the node with the active virtual machine for repeating the transfer of checkpoint packets and entering descriptors until all the checkpoint data for every checkpointed component is written to the node with the standby virtual machine;

a table of contents process on the node with the active virtual machine for transferring the table of contents from the node with the active virtual machine to the receive buffer of the node with the standby virtual machine;

an interrupt process on the node with the active virtual machine for sending an interrupt to the node with the standby virtual machine indicating that all the checkpoint data has been transferred; and a commit process on the node with the standby virtual machine for committing the checkpoint data.

9. The system of claim 8 wherein the receive buffer comprises a plurality of memory pages and a flag process on the node with the active virtual machine enters a byte in a receive buffer allocation map in memory on the node with the active virtual machine for each page of receive buffer holding a checkpoint data packet transferred to the node with the standby virtual machine.

10. The system of claim 9 further comprising: a purge process on the node with the standby virtual machine removing the checkpoint data from the receive buffer on the node with the standby virtual machine; and a clear process on the node with the standby virtual machine clearing the receive buffer allocation map on the node with the active virtual machine after the checkpoint data has been committed.

11. The system of claim 10 wherein the checkpoint data on the node with the standby virtual machine is removed by the commit process on the node with the standby virtual machine committing the checkpoint data.

12. The system of claim 8 wherein there is a separate commit process on the node with the standby virtual machine committing checkpoint data for each type of checkpoint data.

13. The system of claim 8 wherein the nodes with the active and standby virtual machines each comprise at least one virtual machine and a separate process is created for each checkpointed component on each virtual machine of the node with the active virtual machine.

* * * * *